United States Patent
Xu

(10) Patent No.: US 12,261,694 B2
(45) Date of Patent: Mar. 25, 2025

(54) TERMINAL DEVICE BASED ON DOWNLINK DATA PROCESSING ACCELERATOR

(71) Applicant: Spreadtrum Communications (Shanghai) Co., Ltd., Shanghai (CN)

(72) Inventor: Jin Xu, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 350 days.

(21) Appl. No.: 17/843,998

(22) Filed: Jun. 18, 2022

(65) Prior Publication Data

US 2023/0075613 A1   Mar. 9, 2023

Related U.S. Application Data

(63) Continuation of application No. PCT/CN2020/133397, filed on Dec. 2, 2020.

(30) Foreign Application Priority Data

Dec. 18, 2019   (CN) .......................... 201911307661.8

(51) Int. Cl.
*H04L 1/00* (2006.01)
*H04W 28/06* (2009.01)
(Continued)

(52) U.S. Cl.
CPC ........... *H04L 1/0061* (2013.01); *H04W 28/06* (2013.01); *H04W 76/19* (2018.02); *H04W 80/02* (2013.01)

(58) Field of Classification Search
CPC .... H04L 1/0061; H04W 76/19; H04W 28/06; H04W 80/02
See application file for complete search history.

(56) References Cited

U.S. PATENT DOCUMENTS

| | | |
|---|---|---|
| 2010/0180006 A1 | 7/2010 | Nourbakhsh et al. |
| 2017/0135132 A1 | 5/2017 | Selvaganapathy |

(Continued)

FOREIGN PATENT DOCUMENTS

| | | |
|---|---|---|
| CN | 101076163 A | 11/2007 |
| CN | 101610548 A | 12/2009 |

(Continued)

OTHER PUBLICATIONS

International Search Report of International Application PCT/CN2020/133397, mailed Feb. 26, 2021.

(Continued)

*Primary Examiner* — Jasper Kwoh
(74) *Attorney, Agent, or Firm* — KILPATRICK TOWNSEND & STOCKTON LLP

(57) ABSTRACT

A terminal device includes: a PHY decoding accelerator, a downlink data processing accelerator and a CP; where the PHY decoding accelerator is configured to decode and CRC check received downlink data, and send a correctly decoded transport block (TB) to the downlink data processing accelerator; the downlink data processing accelerator performs processing operations of a MAC layer, a RLC layer, and a PDCP layer on the TB to obtain an MAC CE, an RLC control PDU, an RLC TMD PDU, a PDCP control PDU and a PDCP data SDU, and outputs to the CP; and the CP processes the MAC CE, the RLC control PDU, the RLC TMD PDU, the PDCP control PDU and the PDCP data SDU.

20 Claims, 5 Drawing Sheets

(51) Int. Cl.
*H04W 76/19* (2018.01)
*H04W 80/02* (2009.01)

(56) References Cited

U.S. PATENT DOCUMENTS

| | | | |
|---|---|---|---|
| 2018/0124767 A1* | 5/2018 | Shaheen | H04W 28/06 |
| 2018/0124843 A1* | 5/2018 | Shaheen | H04W 76/11 |
| 2018/0242115 A1 | 8/2018 | Kim et al. | |
| 2019/0082040 A1 | 3/2019 | Aziz et al. | |
| 2019/0097936 A1* | 3/2019 | Yang | H04W 12/03 |
| 2020/0236591 A1* | 7/2020 | Yi | H04L 67/12 |

FOREIGN PATENT DOCUMENTS

| | | |
|---|---|---|
| CN | 101742673 A | 6/2010 |
| CN | 102007812 A | 4/2011 |
| CN | 103581070 A | 2/2014 |
| CN | 104349385 A | 2/2015 |
| CN | 104838366 A | 8/2015 |
| CN | 105704197 A | 6/2016 |
| CN | 105991625 A | 10/2016 |
| CN | 108476508 A | 8/2018 |
| CN | 108632899 A | 10/2018 |
| CN | 109286597 A | 1/2019 |
| CN | 109413692 A | 3/2019 |
| CN | 110071935 A | 7/2019 |
| CN | 110199541 A | 9/2019 |
| CN | 110311692 A | 10/2019 |
| CN | 110995750 A | 4/2020 |

OTHER PUBLICATIONS

3GPP Release15 TS 37.324 V15.1.0—Service Data Adaptation Protocol (SDAP) specification.
3GPP Release15 TS 38.321 V15.7.0—Medium Access Control (MAC) protocol specification.
3GPP Release15 TS 38.300 V15.7.0—NR and NG-RAN Overall Description.
3GPP Release15 TS 38.322 V15.5.0—Radio Link Control (RLC) protocol specification.
3GPP Release15 TS 38.323 V15.5.0—Packet Data Convergence Protocol (PDCP) specification.
3GPP Release15 TS 38.331 V15.7.0—Radio Resource Control (RRC) protocol specification.
3GPP TSG-RAN WG2 #98-AH R2-1707159—SDAP Header Format.
First Office Action received in CN Application 201911307661.8, mailed Mar. 3, 2021.
Notice of Allowance received in CN Application 201911307661.8, mailed Aug. 17, 2021.
Li Heng, "Low power design method for a baseband processor chip based on the Tiantong satellite mobile communication system", issued on Telecommunications Network Technology No. 10, p. 21-25.

* cited by examiner

US 12,261,694 B2

TERMINAL DEVICE BASED ON DOWNLINK DATA PROCESSING ACCELERATOR

CROSS-REFERENCE TO RELATED APPLICATIONS

This application is a continuation of International Application No. PCT/CN2020/133397, filed on Dec. 2, 2020, which claims priority to Chinese Patent Application No. 201911307661.8, filed on Dec. 18, 2019. The disclosures of the aforementioned applications are hereby incorporated by reference in their entireties.

TECHNICAL FIELD

Embodiments of the present disclosure relate to the field of communication technologies and, in particular, to a terminal device.

BACKGROUND

With the development of communication technology, 5G communication systems have been widely studied to achieve transmission requirements of large capacity and high rate.

SUMMARY

An embodiment of the present disclosure provides a terminal device, including:
  a physical layer (PHY) decoding accelerator, a downlink data processing accelerator and a communication processor (CP);
  where the PHY decoding accelerator is configured to decode and cyclic redundancy check (CRC) received downlink data, and send a correctly decoded transport block (TB) to the downlink data processing accelerator;
  the downlink data processing accelerator is configured to perform processing operations of a media access control (MAC) layer, a radio link control (RLC) layer, and a packet data convergence protocol (PDCP) layer on the TB, to obtain an MAC control element (CE), an RLC control protocol data unit (PDU), an RLC transparent mode data protocol data unit (TMD PDU), a PDCP control protocol data unit (PDU) and a PDCP data service data unit (SDU); and
  the CP is configured to process the MAC CE, the RLC control PDU, the RLC TMD PDU, the PDCP control PDU and the PDCP data SDU.

An embodiment of the present disclosure provides a chip, including: a processer and a communication interface, where the processor includes at least one of the following components: a physical layer (PHY) decoding accelerator, a downlink data processing accelerator, a communication processor (CP) and an application processor (AP);
  where the PHY decoding accelerator is configured to decode and cyclic redundancy check (CRC) check received downlink data, and send a correctly decoded transport block (TB) to the downlink data processing accelerator;
  the downlink data processing accelerator is configured to perform processing operations of a media access control (MAC) layer, a radio link control (RLC) layer, and a packet data convergence protocol (PDCP) layer on the TB, to obtain an MAC control element (CE), an RLC control protocol data unit (PDU), an RLC transparent mode data protocol data unit (TMD PDU), a PDCP control protocol data unit (PDU) and a PDCP data service data unit (SDU); and
  the CP is configured to process the MAC CE, the RLC control PDU, the RLC TMD PDU, the PDCP control PDU and the PDCP data SDU.

BRIEF DESCRIPTION OF DRAWINGS

Accompanying drawings herein are incorporated in and constitute part of the description, illustrate embodiments consistent with the present disclosure and serve to explain principles of the present disclosure together with the description.

Figure 1:
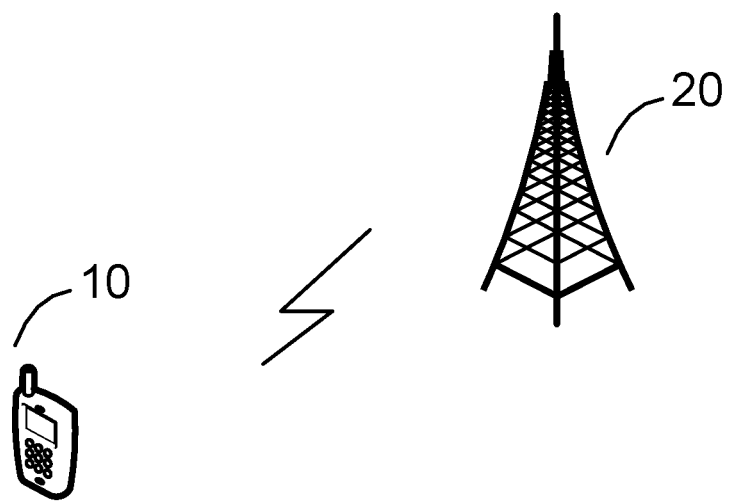
FIG. 1 is a schematic diagram of a network architecture provided by an embodiment of the present disclosure.

The above-mentioned accompanying drawings have shown clear embodiments of the present disclosure, which will be described in more detail hereinafter. These accompanying drawings and written descriptions are not intended to limit the scope of concepts of the present disclosure in any way, but to illustrate the concepts of the present disclosure to those skilled in the art by referring to specific embodiments.

DESCRIPTION OF EMBODIMENTS

Exemplary embodiments will be described in detail herein, examples of which are illustrated in the accompanying drawings. When the following description refers to the accompanying drawings, same numerals in different accompanying drawings refer to same or similar elements unless otherwise indicated. Implementations described in the exemplary embodiments below do not represent all implementations consistent with the present disclosure. Rather, they are merely examples of apparatus and methods consistent with some aspects of the present disclosure as recited in the appended claims.

Terms of "comprising" and "having" and any variations thereof in the description, the claims and the accompanying drawings of the present disclosure are intended to cover non-exclusive inclusions. For example, a process, a method, a system, a product or a device including a series of steps or units is not limited to listed steps or units, but optionally also includes unlisted steps or units, or optionally also includes other steps or units inherent to these processes, methods, products or devices.

A terminal device involved in the present disclosure may be a device that provides voice and/or data connectivity to a user, a handheld device with wireless connection functions, or other processing devices connected to a wireless modem. The terminal device may communicate with at least one core network via a radio access network (RAN for short). The terminal device may be a mobile terminal, such as a mobile phone (or called "cellular" phone) and a computer with a mobile terminal, for example, may be a portable, a pocket-sized, a hand-held, a computer-built or a vehicle-mounted mobile apparatus, which exchange voice and/or data with the radio access network. The terminal device can also be called a subscriber unit, a subscriber station, a mobile radio station, a mobile station, a remote station, an access point, a remote terminal, an access terminal, a user terminal, a user agent or user equipment, which is not limited here.

In addition, a network device involved in the present disclosure may be a base transceiver station (BTS for short) in the global system of mobile communication (GSM for short) or code division multiple access (CDMA for short), or it may be a NodeB (NB for short) in the wideband code division multiple access (WCDMA for short), or it may also be an evolved NodeB (eNB for short) in the long term evolution (LTE for short) or evolved long term evolution (eLTE for short), or a next generation-evolved NodeB (ng-eNB for short), an access point (AP for short) or a relay station in the wireless local area network (WLAN for short), or a gNB in the 5G NR, which is not limited here.

In current Long Term Evolution (LTE for short) and 5th generation (5G for short) New Radio (NR for short) systems, a protocol processing of downlink data is implemented mainly based on software running on the central processing unit (CPU for short) (implementing media access control (MAC for short) receiver (RX for short), radio link control (RLC for short) RX, packet data convergence protocol (PDCP for short) RX, service data adaptation protocol (SDAP for short) RX (there is an SDAP layer in the NR system) and other protocol functions), with an increase of transmission rate of the downlink data, CPU resources required by a communication processor (CP for short) are increasing. Therefore, a CPU dominant frequency and an amount of CPU cores required by the CP have to be increased, causing increasing power consumption and cost of a chip Firstly, an application scenarios involved in the present disclosure are introduced:

FIG. 1 is a schematic diagram of a network architecture provided by an embodiment of the present disclosure, and a technical solution provided by the present disclosure is based on the network architecture shown in FIG. 1. The network architecture includes at least one terminal device 10 that communicates with a network device 20 through a wireless interface. For the sake of clarity, only one terminal device and one network device are shown in FIG. 1.

In current LTE and 5G NR systems, a protocol processing of downlink data (implementing MAC RX, RLC RX, PDCP RX, SDAP RX (there is an SDAP layer in the NR system) and other protocol functions) is implemented mainly based on software running on a CPU. As a transmission rate of the downlink data increases, CPU resources are increasingly required. Therefore, a CPU dominant frequency and an amount of CPU cores of a communication processor (CP for short) have to be increased, causing increasing power consumption and cost of a chip.

The increase in rate also leads to an increasing requirement for a double data rate (DDR for short) bandwidth by the CP. In a low-cost system on chip (SOC for short) solution, an application processor (AP for short) and the CP share one DDR, therefore, the DDR bandwidth requirement of the CP needs to be reduced.

A processing flow of downlink data of a UE is mainly to perform an MAC receiving RX, RLC receiving RX, PDCP receiving RX, SDAP receiving RX and other protocols related processing on a TB that correctly decoded by a PHY decoding accelerator (mainly performing PHY decoding and CRC checking and other operations), the main operations include but not limited to:

the MAC receiving RX sub-module completes demultiplexing on the TB submitted by the physical layer (PHY for short), and decodes an MAC subheader to obtain an MAC service data unit (SDU for short), an MAC control element (CE for short) and a padding; submits the MAC SDU to the RLC RX sub-module for further processing; and submits the MAC CE to a special module for further processing.

The RLC RX sub-module processes the received MAC SDU (that is, the RLC protocol data unit (PDU for short)) according to a mode of a logical channel where it is located, and decodes an RLC Header to obtain the RLC SDU (or SDU fragment) and RLC Control PDU. The RLC RX further processes these packets according to a transmission mode:

in a transparent mode, RLC transparent mode data (TMD for short) PDU is directly submitted to a radio resource control (RRC for short) module of the CP for processing.

In an unacknowledged UM mode, the RLC SDU lost at a bottom layer is monitored and a reassembly window is maintained; and the RLC SDU in the received UM mode data UMD PDU is reassembled and the reassembled RLC SDU is submitted to the PDCP RX; and the UMD PDU that cannot be reassembled into a complete RLC SDU is discarded.

In an acknowledge AM mode, it is checked that whether AM mode data AMD PDUs are repeatedly received and duplicate AMD PDUs are discarded; lost AMD PDUs are monitored and a network side retransmission is requested; the RLC SDUs are reassembled according to the received AMD PDUs and are submitted to the PDCP RX; a receiving status PDU (that is, the RLC control PDU) is submitted to the uplink data processing module for processing; and a receiving status of the data packet in a receiving window is provided to the uplink data processing module, and a status report is generated by the uplink data processing module and is reported to the network side.

The PDCP RX sub-module decodes the PDCP Header for the received RLC SDU (that is, the PDCP PDU) to obtain the PDCP data SDU and PDCP control PDU, and processes it according to a configuration of a radio bearer (RB for short) where it is located. Functions such as header decompression (using robust header compression (ROHC for short) protocol), decryption and integrity check, duplication detection, reordering and sequential submission, duplicate packet discarding, PDCP reconstruction are implemented, the received PDCP Status PDU is submitted to the uplink data processing module or a ROHC module for processing; a status report is generated and reported to the network side by the uplink data processing module according to the receiving status of the data packets in the receiving window provided to the uplink data processing module; the PDCP RX sub-module directly outputs the PDCP data SDU on a decrypted Data radio bearers (DRB for short) to a AP-CP shared Buffer, and the PDCP RX sub-module notifies the AP to extract from the AP-CP shared Buffer after striping the PDCP data SDU to obtain an Internet protocol (IP for short) packet; and the PDCP RX sub-module submits the PDCP data SDU on a decrypted signaling radio bearers (SRB for short) to an RRC module of the CP for processing.

The SDAP RX sub-module decodes the SDAP Header for the received data packet to obtain the SDAP SDU and submits it to the AP; and extracts relevant preset information from an IP Header of the received data packet to complete an operation related to a reflective mapping; and completes other protocol stipulated operations.

At present, the power consumption of the CPU can be reduced by the following solutions:
one solution: the decryption and integrity check in the PDCP RX are implemented by a hardware accelerator (encryption and decryption accelerator for short), and other functions involved in the downlink data processing are completed in the downlink data processing module, which is implemented by software and runs on the CPU, that is, running on the CP.

Figure 2:
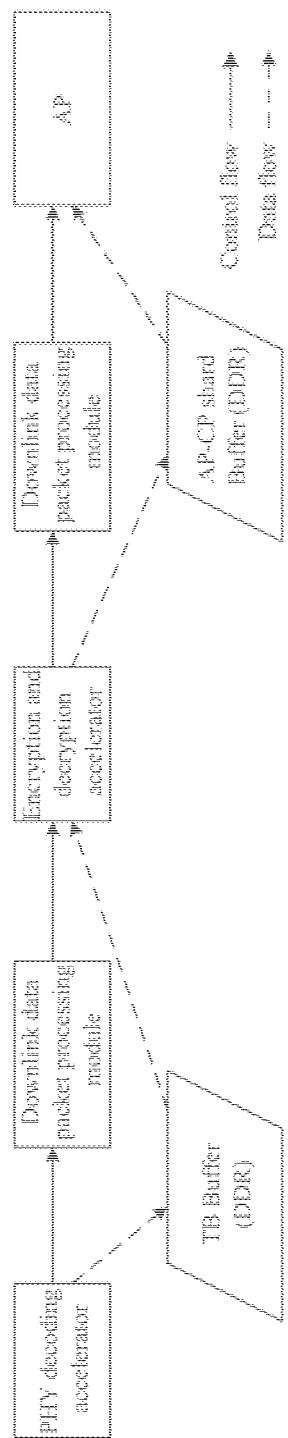
FIG. 2 is a schematic diagram of a downlink data processing principle according to an embodiment provided by the present disclosure.

As shown in FIG. 2, an interaction flow between a downlink data processing module, a physical layer PHY decoding accelerator and an encryption and decryption accelerator is as follows:
the PHY decoding accelerator puts a successfully decoded transform block (TB for short) into a TB Buffer (DDR), and notifies the downlink packet processing module to receive a new TB.

An MAC RX sub-module, an RLC RX sub-module and a PDCP RX sub-module of the downlink data packet processing module perform a protocol-related processing on the received TB, and the PDCP RX sub-module submits the PDCP Data PDU to the encryption and decryption accelerator for decryption and integrity check processing. In which, the PDCP Data PDU is obtained by adding the PDCP Data SDU to the PDCP Header.

The encryption and decryption accelerator outputs the PDCP data SDU transmitted on the DRB that has been decrypted and passed the integrity check to the AP-CP shared Buffer, and outputs the PDCP data SDU transmitted on a SRB that has been decrypted and passed the integrity check to the CP Buffer, and then notifies the PDCP RX sub-module of a processing result, that is, notify a downlink data packet processing module on the right side of the encryption and decryption accelerator in FIG. 2 for further processing.

The PDCP RX sub-module submits the PDCP SDU decrypted and transmitted on the signaling radio bearers (SRB for short) to a Radio Resource Control (RRC for short) module; and for the PDCP SDU transmitted on a Data radio bearers (DRB for short), if the DRB header compression is enabled, the header needs to be decompressed firstly, and secondly, if there is an SDAP layer, which will be processed by an SDAP RX module to further obtain the SDAP SDU (the SDAP Header is stripped through the PDCP SDU, that is, obtaining by a simple address offset to an IP packet), then the AP is notified to extract the IP packet; otherwise, the AP is directly notified to extract the IP packet.

Furthermore, in order to reduce CPU overhead of the downlink data packet processing module, the inventor implements the Header decoding function with a hardware accelerator on the basis of the above solution.

Figure 3:
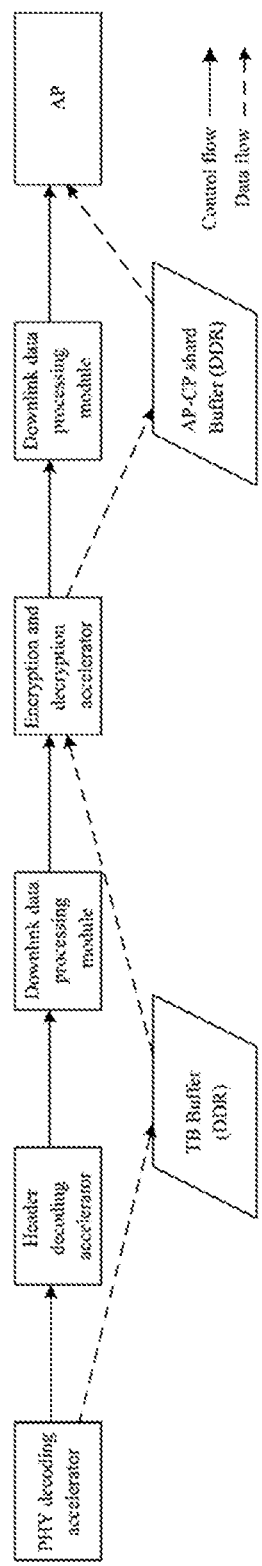
FIG. 3 is a schematic diagram of a downlink data processing principle according to another embodiment provided by the present disclosure.

Specifically, as shown in FIG. 3, after the PHY decoding accelerator puts a successfully decoded TB into a TB Buffer, a hardware accelerator (called a header decoding accelerator) is used to complete decoding operations of MAC Subheader, RLC Header, PDCP Header and SDAP Header in the TB. The header decoding accelerator outputs relevant Header information and MAC CE, RLC Control PDU, PDCP control PDU, PDCP Data PDU, RLC TMD PDU and the like in a certain form, and then performs MAC, RLC, PDCP processing through software running on the CPU on the information and data packet, and the PDCP Data PDU is needed to be submitted an encryption and decryption accelerator for decryption and integrity check.

The PHY decoding accelerator puts the successfully decoded TB into the TB buffer, and then notifies the Header decoding accelerator to perform related header parsing work.

The downlink data packet processing module needs to interact with the PHY decoding accelerator, the Header decoding accelerator and the encryption and decryption accelerator. On the one hand, a software and hardware interaction will bring additional CPU overhead to the software operation; and on the other hand, there are multiple reading and writing operations about the DDR in a data processing process. For example, including the following operations:
1) the PHY decoding accelerator writes the successfully decoded TB into the TB Buffer (Buffer);
2) the encryption and decryption accelerator reads the PDCP Data PDU content from the TB Buffer; and
3) the encryption and decryption accelerator writes the PDCP SDU decrypted by the PDCP Data PDU into an AP-CP shared Buffer (the AP-CP shared Buffer is a Buffer in the DDR).

At a high speed, these operations will consume a lot of DDR bandwidth.

In the present disclosure, the downlink data processing accelerator is used to complete most or all of the functions specified in downlink data processing protocols, and the functions that the CP needs to run are greatly reduced, thereby reducing power consumption and cost of an entire system, and reducing requirements for the DDR bandwidth by the entire system.

Technical solutions of the present disclosure will be described in detail below with specific embodiments. The following specific embodiments may be combined with each other, and same or similar concepts or processes may not be repeated in some embodiments.

Figure 4:
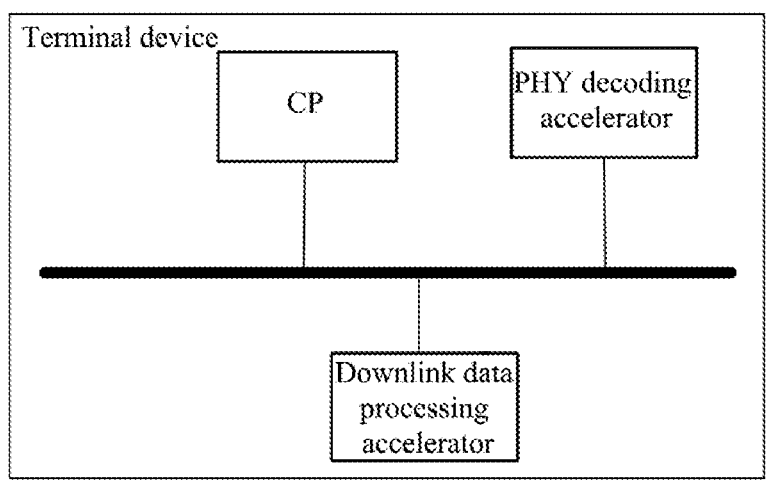
FIG. 4 is a schematic structural diagram of an embodiment of a terminal device provided by the present disclosure.

FIG. 4 is a schematic structural diagram of an embodiment of a terminal device provided by the present disclosure. As shown in FIG. 4, the terminal device provided in this embodiment includes:
a Physical layer (PHY for short) decoding accelerator, a downlink data processing accelerator and a communication processor (CP for short);
where the PHY decoding accelerator is configured to decode and CRC check received downlink data, and send a correctly decoded transport block (TB for short) to the downlink data processing accelerator;
the downlink data processing accelerator is configured to perform processing operations of a media access control (MAC for short) layer, radio link control (RLC for short) layer, and a packet data convergence protocol (PDCP for short) layer on the TB, to obtain an MAC control element (CE for short), an RLC control protocol data unit (PDU for short), an RLC transparent mode data protocol data unit (TMD PDU for short), a PDCP control protocol data unit (PDU for short) and a PDCP data service data unit (SDU for short); and
the CP is configured to process the MAC CE, the RLC control PDU, the RLC TMD PDU, the PDCP control PDU and the PDCP data SDU.

Specifically, in a low-rate communication system, a downlink data processing can be implemented by loading software through the processor; but in a high-rate communication system, more and more CPU resources are required to process data, causing increasing power consumption and cost of a chip. Therefore, the present disclosure considers to be implemented by a downlink data processing accelerator. The downlink data processing accelerator implements the downlink data processing through an application specific integrated circuit (ASIC for short), processing efficiency of which is high, but it is generally difficult to implement the ASIC.

The physical layer PHY decoding accelerator in the present disclosure performs decoding and CRC on the received downlink data, and sends the correctly decoded TB to the downlink data processing accelerator; the downlink data processing accelerator performs the processing operations of the MAC layer, RLC layer and PDCP layer on the TB, to obtain the MAC CE, RLC control PDU, RLC transparent mode data (TMD for short) PDU, PDCP control PDU and PDCP data SDU, and outputs to a memory, and further outputs to the AP-CP shared Buffer in the memory, and the memory is, for example, DDR; and the CP processes the MAC CE, the RLC control PDU, the RLC TMD PDU, the PDCP control PDU and PDCP data SDU.

The processing operations of the MAC layer, the RLC layer, and the PDCP layer may include operations specified by standard protocols.

Figure 5:
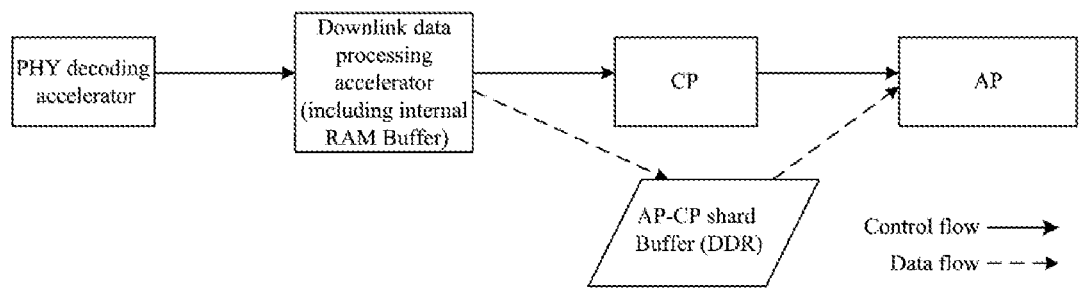
FIG. 5 is a schematic diagram of a downlink data processing principle according to another embodiment provided by the present disclosure.

As shown in FIG. 5, each time a PHY decoding accelerator successfully decodes one TB, a downlink data processing accelerator is directly triggered to perform related data processing; and
  after the downlink data processing accelerator performs related processing, a processing result is output to a memory and a CP is notified to further process by a software program in the CP. The CP processes the received MAC CE, RLC Control PDU, RLC TMD PDU, PDCP control PDU and PDCP data SDU, and notifies the AP to extract an IP packet from the AP-CP shared Buffer after the PDCP data SDU that output on the DRB of the AP-CP shared Buffer is stripped to obtain the IP packet.

Figure 6:
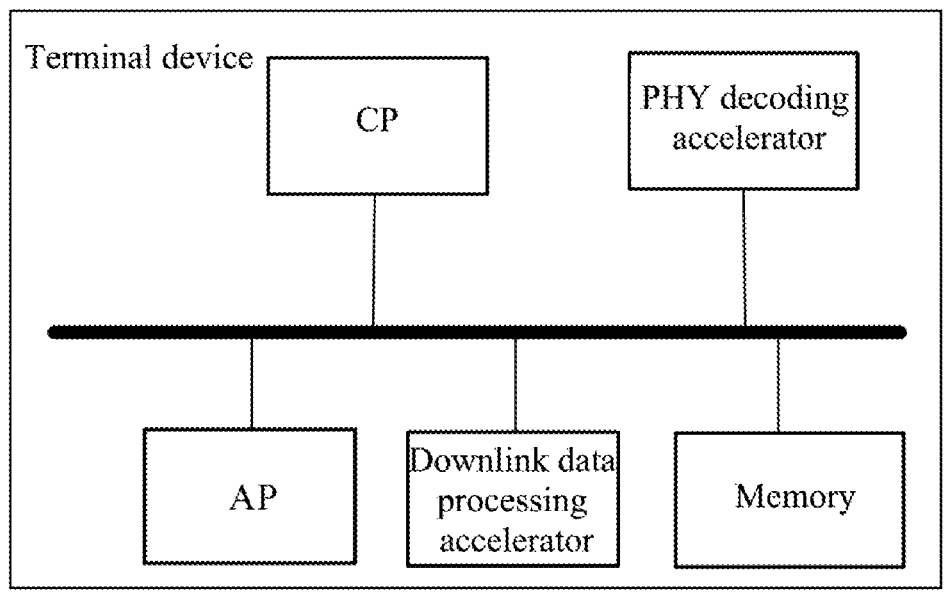
FIG. 6 is a schematic structural diagram of another embodiment of a terminal device provided by the present disclosure.

Further, as shown in FIG. 6, the terminal device further includes: a memory, a downlink data processing accelerator, and is also configured to:
  output the MAC CE, the RLC control PDU, the RLC TMD PDU, the PDCP control PDU and PDCP data SDU to the memory.

The terminal device further includes: an application processor (AP for short), the PDCP data SDU includes first PDCP data SDU and second PDCP data SDU; the first PDCP data SDU is used for transmission through a data radio bearer (DRB for short); and the second PDCP data SDU is used for transmission through a signaling radio bearer (SRB for short); and
  the CP is specifically configured to:
  strip the first PDCP data SDU that output to the AP-CP shared Buffer of the memory to obtain the IP packet, and inform the AP to extract the IP packet from the memory.

Specifically, as shown in FIG. 5, an AP-CP shared Buffer may be provided in a memory for storing first PDCP data SDU. A software program in the CP will further process the first PDCP data SDU. In one embodiment, the CP performs header decompression on the first PDCP data SDU with header compression enabled.

If there is an SDAP layer, the CP performs an SDAP Header removal operation on the first PDCP data SDU, that is, decoding the SDAP Header to obtain the SDAP SDU, and the SDAP SDU (that is, the IP packet) can be obtained through a simple address offset, and then notifies the AP is notified to extract;

otherwise, the CP directly notifies the AP to extract the IP packet (that is, the PDCP data SDU).

For the second PDCP data SDU, the downlink data processing accelerator directly submits it to the memory, and the software program in the CP notifies an RRC module of the CP for processing.

For the RLC TMD PDU, the downlink data processing accelerator directly submits it to the memory, and the software program in the CP notifies the RRC module of the CP for processing.

In one embodiment, the memory is a double rate synchronous dynamic random access memory DDR.

In which, the memory may also store other data such as executable instructions of the CP, and may also store other data such as executable instructions of the AP.

The terminal device in this embodiment includes: the physical layer PHY decoding accelerator, the downlink data processing accelerator, the communication processor (CP for short) and the application processor (AP for short); where the PHY decoding accelerator is configured to decode and CRC check the received downlink data, and send the correctly decoded transport block (TB for short) to the downlink data processing accelerator; the downlink data processing accelerator is configured to perform the processing operations of the media access control (MAC) layer, the radio link control (RLC for short) layer, the packet data convergence protocol (PDCP for short) layer on the TB, to obtain the MAC control element CE, the RLC control protocol data unit (PDU for short), the RLC transparent mode data (TMD for short) PDU, the PDCP control protocol data unit (PDU for short) and the PDCP data service data unit (SDU for short); and the CP is configured to process the MAC CE, the RLC control PDU, the RLC TMD PDU, the PDCP control PDU and the PDCP data SDU. Since the above-mentioned processing operations of the MAC layer, the RLC layer and the PDCP layer on the TB that originally performed by the CP are implemented through the downlink data processing accelerator, which can greatly reduce processor resource consumption by the CP, reduce power consumption and cost of a chip, and reduce DDR bandwidth requirements by a system On the basis of the foregoing embodiment, the downlink data processing accelerator is further configured to:
  output a receiving state of a data packet in a data receiving window of the RLC layer to the memory, where the receiving state of the data packet is used for the CP to generate a state report and send it to a network device; and
  output the receiving state of the data packet in the data receiving window of the PDCP layer to the memory, where the receiving state of the data packet is used for the CP to generate the state report and send it to the network device.

In one embodiment, the downlink data processing accelerator can also output the receiving status of the data packets in the data receiving window of the RLC layer, which includes a receiving situation and status variables, and the software program of the CP would further process to generate the status report and send it to the network device side.

In one embodiment, the downlink data processing accelerator can also output the receiving status of the data packets in the data receiving window of the PDCP layer, which includes the receiving situation and status variables, and the software program of the CP would further process to generate the status report and send it to the network device side.

In one embodiment, the downlink data processing accelerator is further configured to:
decode the SDAP Header in the first PDCP data SDU to obtain a reflection QoS indication (RQI for short); and
if the reflection QoS indication (RQI for short) in the SDAP header is a preset value, extract relevant preset information from the IP Header of the SDAP SDU, and output to the memory.

If the reflection QoS indication (RQI for short) in the SDAP Header is 1, the relevant preset information is extracted from the IP Header and output to the memory, and the software program of the CP would perform reflective mapping related processing.

In an embodiment, the downlink data processing accelerator is further configured to perform at least one of the following operations:
performing a radio resource control (RRC for short) reestablishment and RRC connection reconfiguration of the PDCP entity and the RLC entity;
maintaining state variables of the RLC entity; and
maintaining state variables of the PDCP entity.

In an embodiment, the downlink data processing accelerator is further configured to:
perform NR PDCP processing on the received RLC SDU of the RLC layer of the long term evolution (LTE for short) system.

Specifically, the downlink data processing accelerator can also support the following functions:
supporting a reestablishment and reconfiguration (including addition, deletion, modification and release) of the PDCP entity and the RLC entity;
maintaining the state variables for each RLC entity, and supporting functions supported by the RLC RX specified by protocols such as RLC reassembly; and
maintaining the state variables for each PDCP entity, supporting functions supported by the PDCP RX specified by protocols such as PDCP reordering, decryption, integrity check and the like (excluding the header decompression).

Moreover, the downlink data processing accelerator can also support processing RLC SDUs submitted from the RLC layer of the LTE system according to a NR PDCP.

In summary, the downlink data processing accelerator can complete the related operations defined by the protocol on the MAC RX, the RLC RX, the PDCP RX and the SDAP RX. The downlink data processing accelerator stores the processing result in the memory, and the CP obtains the data from the memory and performs subsequent operations.

On the basis of the above embodiment, the downlink data processing accelerator includes an internal random access memory (RAM for short) buffer (Buffer). And the PHY decoding accelerator is also configured to:
if the TB is received correctly, write the TB directly into the internal RAM Buffer of the downlink data processing accelerator; and
if the TB includes at least one CB with a CRC error, output the TB to the TB buffer (Buffer) of the memory, and notify the downlink data processing accelerator to process the TB until all CBs of the TB are successfully received.

Specifically, data interaction between the PHY decoding accelerator and the downlink data processing accelerator is mainly implemented through the internal RAM Buffer of the downlink data processing accelerator. During a decoding process, the PHY decoding accelerator:
if one TB is transmitted correctly only through a new transmission of a Hybrid Automatic Retransmission Request (HARQ for short), then directly inputs it into the internal RAM Buffer of the downlink data processing accelerator shared between the PHY decoding accelerator and the downlink data processing accelerator.

If there are some coding blocks (CB for short) having the CRC errors in one TB, the PHY decoding accelerator outputs the TB into the corresponding TB Buffer (the TB Buffer can be opened from DDR space), these CBs having the CRC errors are waiting to be HARQ retransmission. When all CBs of the TB are successfully received, the downlink data packet accelerator is notified to process the TB.

In the above implementations, the downlink data processing accelerator can work together with the PHY decoding accelerator, and the TB correctly decoded by the PHY decoding accelerator is directly submitted to the downlink data processing accelerator for processing without software participation.

For a high-speed data transmission scenario with high DDR bandwidth requirements, a probability of HARQ retransmission is very low (the higher the HARQ retransmission, a network device will naturally reduce the modulation and coding scheme (MCS for short), and the data transmission rate will get lower), therefore, most of the data interaction between the PHY decoding accelerator and the downlink data processing accelerator is performed through the internal RAM Buffer of the downlink data processing accelerator.

The data transmission rates of the LTE and NR systems are increasingly high, which mainly referring to an increasing number of data packets transmitted on the DRB per unit time. In the present disclosure, after the PHY decoding accelerator decodes one TB correctly, the downlink data processing accelerator can directly obtain the first PDCP SDU transmitted on the DRB that has decrypted and passed the integrity check, and would be directly output to the AP-CP shared Buffer. The data packet-related processing procedures specified in the MAC, the RLC, the PDCP, and the SDAP protocols for the data packets transmitted on the DRB are implemented by the downlink data processing accelerator without software participation.

In the present disclosure, on the one hand, the consumption of processor resources by software can be greatly reduced, thereby reducing power consumption and cost of the chip; on the other hand, the DDR bandwidth required for the downlink data processing is greatly reduced (the decrypted data packet is directly written into the AP-CP shared Buffer), which brings great benefits to the low-cost SOC chip solution; on another hand, delay of the downlink data processing is greatly reduced and controllable, which is of great benefit to low-latency business scenarios such as ultra reliable low latency communication (URLLC for short) and the like in NR.

The solution of the present disclosure can be mainly applied to the downlink data processing of LTE and NR, and applied to related SOC mobile phone chip solutions.

In an embodiment of the present disclosure, a communication system is further provided, including the terminal device and the network device according to any of the foregoing embodiments.

An embodiment of the present disclosure provides a chip, including: a processing module and a communication interface, where the processing module includes at least one of the following components included in the terminal device according to any of the foregoing embodiments: a physical layer (PHY for short) decoding accelerator, a downlink data processing accelerator, a communication processor (CP for short) and an application processor (AP for short).

Furthermore, the chip also includes a storage module (for example, a memory), the storage module is configured to store instructions, the processing module is configured to execute the instructions stored in the storage module, and an execution of the instructions stored in the storage module enables the processing module to execute the solution implemented by the terminal device in any of the foregoing embodiment.

Those skilled in the art will easily think of other implementation solutions of the present disclosure upon considering the specification and practicing the invention disclosed herein. The present disclosure is intended to cover any variations, uses, or adaptive changes of the present disclosure, which follow general principles of the present disclosure and include common knowledge or technical means in the technical field not disclosed by the present disclosure. The specification and embodiments are to be regarded as exemplary only, actual scope and spirit of the present disclosure are indicated by the following claims.

It is to be understood that the present disclosure is not limited to precise structures described above and illustrated in the accompanying drawings, and various modifications and changes may be made without departing from the scope thereof. The scope of the present disclosure is limited only by the appended claims.

An embodiment of the present application provides a terminal device, so as to reduce processor resource consumption by software, reduce requirements for DDR bandwidth, and reduce power consumption and cost of a chip.

An embodiment of the present application provides a terminal device, including:
a physical layer (PHY) decoding accelerator, a downlink data processing accelerator and a communication processor (CP);
where the PHY decoding accelerator is configured to decode and CRC check received downlink data, and send a correctly decoded transport block (TB) to the downlink data processing accelerator;
the downlink data processing accelerator is configured to perform processing operations of a media access control (MAC) layer, a radio link control (RLC) layer, and a packet data convergence protocol (PDCP) layer on the TB, to obtain an MAC control element (CE), an RLC control protocol data unit (PDU), an RLC transparent mode data protocol data unit (TMD PDU), a PDCP control protocol data unit (PDU) and a PDCP data service data unit (SDU); and
the CP is configured to process the MAC CE, the RLC control PDU, the RLC TMD PDU, the PDCP control PDU and the PDCP data SDU.

An embodiment of the present application provides a chip, including: a processing module and a communication interface, where the processing module includes at least one of the following components included in the terminal device according to the first aspect: a physical layer (PHY) decoding accelerator, a downlink data processing accelerator, a communication processor (CP) and an application processor (AP).

The terminal device provided by the embodiment of the present application includes: a physical layer (PHY) decoding accelerator, a downlink data processing accelerator and a communication processor (CP); where the PHY decoding accelerator is configured to decode and CRC check received downlink data, and send a correctly decoded transport block (TB) to the downlink data processing accelerator; the downlink data processing accelerator is configured to perform processing operations of a media access control (MAC) layer, a radio link control (RLC) layer, and a packet data convergence protocol (PDCP) layer on the TB, to obtain an MAC control element (CE), an RLC control protocol data unit (PDU), an RLC transparent mode data (TMD PDU), a PDCP control protocol data unit (PDU) and a PDCP data service data unit (SDU); and the CP is configured to process the MAC CE, the RLC control PDU, the RLC TMD PDU, the PDCP control PDU and the PDCP data SDU. Since the above-mentioned processing operations of the MAC layer, the RLC layer and the PDCP layer on the TB that originally performed by the CP are implemented through hardware of the downlink data processing accelerator, which can greatly reduce consumption of processor resources by the CP, reduce power consumption and cost of a chip, and reduce requirements for DDR bandwidth by a system.

What is claimed is:
1. A terminal device, comprising:
a physical layer (PHY) decoding accelerator, a downlink data processing accelerator and a communication processor (CP); wherein:
the PHY decoding accelerator is configured to decode and perform cyclic redundancy check (CRC) on received downlink data, and send each correctly decoded transport block (TB) to the downlink data processing accelerator to trigger the downlink data processing accelerator for data processing;
the downlink data processing accelerator is configured to perform processing operations of a media access control (MAC) layer, a radio link control (RLC) layer, and a packet data convergence protocol (PDCP) layer on the TB, to obtain an MAC control element (CE), an RLC control protocol data unit (PDU), an RLC transparent mode data protocol data unit (TMD PDU), a PDCP control protocol data unit (PDU) and a PDCP data service data unit (SDU); and
the CP is configured to process the MAC CE, the RLC control PDU, the RLC TMD PDU, the PDCP control PDU and the PDCP data SDU.

2. The terminal device according to claim 1, wherein the terminal device further comprises: a memory, and the downlink data processing accelerator is further configured to:
output the MAC CE, the RLC control PDU, the RLC TMD PDU, the PDCP control PDU and the PDCP data SDU to the memory.

3. The terminal device according to claim 2, wherein the terminal device further comprises: an application processor (AP), the PDCP data SDU comprises a first PDCP data SDU and a second PDCP data SDU; the first PDCP data SDU is used for transmission through a data radio bearer (DRB); and the second PDCP data SDU is used for transmission through a signaling radio bearer (SRB); and
the CP is configured to strip the first PDCP data SDU output into an AP-CP shared Buffer of the memory to obtain an Internet Protocol (IP) packet, and notify the AP to extract the IP packet from the AP-CP shared Buffer of the memory.

4. The terminal device according to claim 2, wherein the downlink data processing accelerator is further configured to:
output a receiving state of a data packet in a data receiving window of the RLC layer to the memory, wherein the receiving state of the data packet is used for the CP to generate a state report and send the state report to a network device; and
output a receiving state of a data packet in a data receiving window of the PDCP layer to the memory, wherein the receiving state of the data packet is used for the CP to generate a state report and send the state report to the network device.

5. The terminal device according to claim 3, wherein the downlink data processing accelerator is further configured to:
  decode a SDAP header in the first PDCP data SDU to obtain a reflection QoS indication (RQI); and
  in response to the reflection QoS indication (RQI) in the SDAP header being a preset value, extract relevant preset information from an Internet protocol (IP) Header of the IP packet, and output the relevant preset information to the memory.

6. The terminal device according to claim 1, wherein the downlink data processing accelerator is further configured to perform at least one of the following operations:
  performing a radio resource control (RRC) reestablishment and RRC connection reconfiguration of a PDCP entity and an RLC entity;
  maintaining a state variable of the RLC entity; and
  maintaining a state variable of the PDCP entity.

7. The terminal device according to claim 1, wherein the downlink data processing accelerator is further configured to:
  perform an NR PDCP processing on a received RLC SDU of the RLC layer of a long term evolution (LTE) system.

8. The terminal device according to claim 1, wherein the downlink data processing accelerator comprises: an internal random access memory (RAM), and the PHY decoding accelerator is further configured to:
  in response to the TB being received correctly, write the TB directly into a buffer (Buffer) of the RAM; and
  in response to the TB comprising at least one coded block (CB) with a CRC error, output the TB to a TB buffer (Buffer) of the memory, and notify the downlink data processing accelerator to processes the TB until all CBs of the TB are successfully received.

9. The terminal device according to claim 3, wherein the CP is further configured to:
  perform a header decompression on the first PDCP data SDU with header compression enabled.

10. The terminal device according to claim 5, wherein the CP is further configured to:
  perform a reflective mapping process according to the relevant preset information extracted from the IP Header.

11. A chip, comprising: a processor and a communication interface, wherein the processor comprises at least one of the following components:
  a physical layer (PHY) decoding accelerator, a downlink data processing accelerator, a communication processor (CP) and an application processor (AP); wherein:
  the PHY decoding accelerator is configured to decode and perform cyclic redundancy check (CRC) on received downlink data, and send each correctly decoded transport block (TB) to the downlink data processing accelerator to trigger the downlink data processing accelerator for data processing;
  the downlink data processing accelerator is configured to perform processing operations of a media access control (MAC) layer, a radio link control (RLC) layer, and a packet data convergence protocol (PDCP) layer on the TB, to obtain an MAC control element (CE), an RLC control protocol data unit (PDU), an RLC transparent mode data protocol data unit (TMD PDU), a PDCP control protocol data unit (PDU) and a PDCP data service data unit (SDU); and
  the CP is configured to process the MAC CE, the RLC control PDU, the RLC TMD PDU, the PDCP control PDU and the PDCP data SDU.

12. The chip according to claim 11, wherein the chip further comprises: a memory, and the downlink data processing accelerator is further configured to:
  output the MAC CE, the RLC control PDU, the RLC TMD PDU, the PDCP control PDU and the PDCP data SDU to the memory.

13. The chip according to claim 12, wherein the PDCP data SDU comprises a first PDCP data SDU and a second PDCP data SDU; the first PDCP data SDU is used for transmission through a data radio bearer (DRB); and the second PDCP data SDU is used for transmission through a signaling radio bearer (SRB); and
  the CP is configured to strip the first PDCP data SDU output into an AP-CP shared Buffer of the memory to obtain an Internet Protocol (IP) packet, and notify the AP to extract the IP packet from the AP-CP shared Buffer of the memory.

14. The chip according to claim 12, wherein the downlink data processing accelerator is further configured to:
  output a receiving state of a data packet in a data receiving window of the RLC layer to the memory, wherein the receiving state of the data packet is used for the CP to generate a state report and send the state report to a network device; and
  output a receiving state of a data packet in a data receiving window of the PDCP layer to the memory, wherein the receiving state of the data packet is used for the CP to generate a state report and send the state report to the network device.

15. The chip according to claim 13, wherein the downlink data processing accelerator is further configured to:
  decode a SDAP header in the first PDCP data SDU to obtain a reflection QoS indication (RQI); and
  in response to the reflection QoS indication (RQI) in the SDAP header being a preset value, extract relevant preset information from an Internet protocol (IP) Header of the IP packet, and output the relevant preset information to the memory.

16. The chip according to claim 11, wherein the downlink data processing accelerator is further configured to perform at least one of the following operations:
  performing a radio resource control (RRC) reestablishment and RRC connection reconfiguration of a PDCP entity and an RLC entity;
  maintaining a state variable of the RLC entity; and
  maintaining a state variable of the PDCP entity.

17. The chip according to claim 11, wherein the downlink data processing accelerator is further configured to:
  perform an NR PDCP processing on a received RLC SDU of the RLC layer of a long term evolution (LTE) system.

18. The chip according to claim 11, wherein the downlink data processing accelerator comprises: an internal random access memory (RAM), and the PHY decoding accelerator is further configured to:
  in response to the TB being received correctly, write the TB directly into a buffer (Buffer) of the RAM; and
  in response to the TB comprising at least one coded block (CB) with a CRC error, output the TB to a TB buffer (Buffer) of the memory, and notify the downlink data processing accelerator to processes the TB until all CBs of the TB are successfully received.

19. The chip according to claim 13, wherein the CP is further configured to:
   perform a header decompression on the first PDCP data SDU with header compression enabled.

20. The chip according to claim 15, wherein the CP is further configured to:
   perform a reflective mapping process according to the relevant preset information extracted from the IP Header.

* * * * *